(12) United States Patent
Jiang et al.

(10) Patent No.: US 10,297,000 B2
(45) Date of Patent: May 21, 2019

(54) HIGH DYNAMIC RANGE IMAGE INFORMATION HIDING METHOD

(71) Applicant: Ningbo University, Ningbo, Zhejiang (CN)

(72) Inventors: Gangyi Jiang, Zhejiang (CN); Yongqiang Bai, Zhejiang (CN); Mei Yu, Zhejiang (CN); Yang Wang, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 56 days.

(21) Appl. No.: 15/807,242

(22) Filed: Nov. 8, 2017

(65) Prior Publication Data

US 2018/0075569 A1    Mar. 15, 2018

(30) Foreign Application Priority Data

Sep. 27, 2017   (CN) .......................... 2017 1 0885604

(51) Int. Cl.
| | |
|---|---|
| *G06T 1/00* | (2006.01) |
| *G06F 21/60* | (2013.01) |
| *G06K 9/46* | (2006.01) |
| *G09C 5/00* | (2006.01) |
| *G06F 21/71* | (2013.01) |

(52) U.S. Cl.
CPC .......... *G06T 1/0021* (2013.01); *G06F 21/602* (2013.01); *G06K 9/46* (2013.01); *G06T 1/0028* (2013.01); *G09C 5/00* (2013.01); *G06F 21/71* (2013.01)

(58) Field of Classification Search
CPC ................. G06T 1/0021; G06T 1/0028; G06T 2201/0051; G06T 2201/0065; H04N 1/32149; H04N 1/32208; H04N 1/32213; H04N 1/32309
See application file for complete search history.

(56) References Cited

U.S. PATENT DOCUMENTS

| | | | | |
|---|---|---|---|---|
| 5,850,346 A | * | 12/1998 | Barrus ................. | G06T 1/0028 708/495 |
| 5,901,178 A | * | 5/1999 | Lee et al. ............. | G06T 1/0028 375/240 |
| 2015/0242983 A1 | * | 8/2015 | DiGiovanni ........... | G06T 1/0021 382/100 |

* cited by examiner

*Primary Examiner* — Andrew W Johns

(57) ABSTRACT

A high dynamic range image information hiding method includes embedding secret information and extracting the secret information. The step of embedding secret information includes obtaining three channel values of every pixel in an original high dynamic range image; according to every channel value and corresponding 5-bit exponent of every pixel, determining an embedding significance bit of the information to be embedded in every channel value of every pixel; embedding information into every channel value of every pixel; and obtaining a high dynamic range image embedded with the secret information. The step of extracting the secret information includes obtaining three channel values of every pixel in the high dynamic range image embedded with the secret information; obtaining an information embedding position of every channel value embedded with the information of every pixel; extracting information from every channel value embedded with the information of every pixel; and obtaining secret information sequences.

3 Claims, 2 Drawing Sheets

HIGH DYNAMIC RANGE IMAGE INFORMATION HIDING METHOD

CROSS REFERENCE OF RELATED APPLICATION

The present invention claims priority under 35 U.S.C. 119(a-d) to CN 201710885604.2, filed Sep. 27, 2017.

BACKGROUND OF THE PRESENT INVENTION

Field of Invention

The present invention relates to an image information hiding technology, and more particularly to a high dynamic range image information hiding method.

Description of Related Arts

In the field of image processing, the dynamic range refers to the logarithm of the maximum and minimum luminosity ratios in a digital image. The dynamic range of the real scene reaches 9 orders of magnitude, but the existing low dynamic range (LDR) image adopts 8 bits/color/pixel to store data and loses part of the scene information. The high dynamic range (HDR) imaging technology makes up for the deficiency, which accurately shows the brightness range of the realistic scene through floating-point data, so that it is increasingly concerned and used in digital photography, ultra-high-definition movies and television, video games, remote sensing, medical imaging and other aspects.

Information hiding is a way to use digital media to hide important information. In recent years, the information hiding technology for low dynamic range images has developed rapidly, but researches on high dynamic range images have just started. The existing high dynamic range image hiding algorithm is able to be divided into two categories, wherein the first category sacrifices the image quality in exchange for higher embedding rate, the embedding rate of the existing top algorithm is only higher than 5 bits per pixel (5 bpps); the second category is able to achieve lossless embedding of information, but the embedding rate is less than 0.2 bits per pixel (0.2 bpp). Therefore, it is necessary to study a high dynamic range image information hiding method which is able to realize the balance between the embedding rate and the image quality.

SUMMARY OF THE PRESENT INVENTION

A technical problem to be solved of the present invention is to provide a high dynamic range image information hiding method with high capacity and high fidelity, which is able to embed secret information into high dynamic range images in OpenEXR format, so that when an embedding rate is 30 bits per pixel, the image embedded with the secret information is still able to remain high fidelity.

Accordingly, in order to solve the above technical problem, the present invention adopts a technical solution as follows. A high dynamic range image information hiding method comprises steps of embedding secret information and extracting the secret information, wherein:

the step of embedding secret information comprises:

①_1 recording an original high dynamic range image in OpenEXR format to be embedded with the secret information as $I_{org}$, wherein: a height of the $I_{org}$ is R and a width thereof is C, recording an original secret information sequence for being embedded into the original high dynamic range image as W, wherein: a value of every information of the W is an integer from 0 to 9, encrypting the W through encryption algorithm, obtaining an encrypted secret information sequence, recording the encrypted secret information sequence as $W_{hide}$, and taking the encryption algorithm as a secret key Key1, wherein: a length of the W is equal to R×C×3;

①_2 according to a numerical conversion formula in OpenEXR format, obtaining three channel values of every pixel in the $I_{org}$, recording an $i^{th}$ channel value of a pixel whose coordinates are (x,y) in the $I_{org}$ as $V_i(x,y)$, wherein $$V_i(x,y) = \begin{cases} (-1)^{S_i(x,y)} 2^{-14}\left(0 + \dfrac{M_i(x,y)}{1024}\right) & E_i(x,y)=0, M_i(x,y)>0 \\ (-1)^{S_i(x,y)} 2^{E_i(x,y)-15}\left(1 + \dfrac{M_i(x,y)}{1024}\right) & 1 \le E_i(x,y) \le 30 \end{cases},$$

here, $1 \le x \le R$, $1 \le y \le C$, i is equal to 1, 2 or 3, a first channel value represents R channel value, a second channel value represents G channel value, a third channel value represents B channel value, $S_i(x,y)$ represents one sign bit of the $i^{th}$ channel of the pixel whose coordinates are (x,y) in the $I_{org}$, $E_i(x,y)$ represents 5-bit exponent of the $i^{th}$ channel of the pixel whose coordinates are (x,y) in the $I_{org}$, $M_i(x,y)$ represents 10-bit mantissa of the $i^{th}$ channel of the pixel whose coordinates are (x,y) in the $I_{org}$;

①_3 according to every channel value and corresponding 5-bit exponent of every pixel in the $I_{org}$, determining an embedding significance bit of the information to be embedded in every channel value of every pixel in the $I_{org}$, recording the embedding significance bit of the information to be embedded in the $i^{th}$ channel value of the pixel whose coordinates are (x,y) in the $I_{org}$ as $ESB_i(x,y)$, and recording the embedding significance bit of the information to be embedded in every channel value of every pixel in the $I_{org}$ as a secret key Key2;

①_4 embedding information into every channel value of every pixel in the $I_{org}$, wherein: embedding information into the $i^{th}$ channel value $V_i(x,y)$ of the pixel whose coordinates are (x,y) in the $I_{org}$ comprises:

①_4a recording a value of an $ESB_i(x,y)^{th}$ embedding significance bit of the information to be embedded of the $V_i(x,y)$ as $D_{ESB_i}(x,y)$, setting a $j^{th}$ information in the $W_{hide}$ as a current information to be embedded in the $W_{hide}$, recording the $j^{th}$ information as $D_{hide}(j)$, wherein: $D_{ESB_i}(x,y) \in [0,9]$, an initial value of the j is 1, $1 \le j \le J$, the J represents a length of the W, $D_{hide}(j) \in [0,9]$;

①_4b judging whether the $D_{ESB_i}(x,y)$ is equal to the $D_{hide}(j)$, wherein: if the $D_{ESB_i}(x,y)$ is equal to the $D_{hide}(j)$, the $V_i(x,y)$ is kept unchanged, so that embedding information into the $i^{th}$ channel value of the pixel whose coordinates are (x,y) in the $I_{org}$ is completed; if the $D_{ESB_i}(x,y)$ is not equal to the $D_{hide}(j)$, the $V_i(x,y)$ is amended to complete embedding information into the $i^{th}$ channel value of the pixel whose coordinates are (x,y) in the $I_{org}$, wherein: the amendment comprises:

(1) setting $V_{i,new}(x,y) = V_i(x,y) + N \times SL_i(x,y)$, (2) after the step (1), according to the $V_{i,new}(x,y)$, determining 5-bit exponent corresponding to the $V_{i,new}(x,y)$ and recording the 5-bit exponent as $E_{i,new}(x,y)$, and then through a manner as same as the step ①_3, according to the $V_{i,new}(x,y)$ and the $E_{i,new}(x,y)$, determining an embedding significance bit of the information to be embedded of the $V_i(x,y)$ and recording the embedding significance bit as $ESB_{i,new}(x,y)$; and then judging whether the $D_{ESB_{i,new}}(x,y)$ of the $ESB_{i,new}(x,y)^{th}$ embedding significance bit of the information to be embedded of the $V_{i,new}(x,y)$ is equal to the $D_{hide}(j)$, wherein if the $D_{ESB_{i,new}}(x,y)$ is equal to the $D_{hide}(j)$, $V_i(x,y)=V_{i,new}(x,y)$ is set, so that embedding information into the $i^{th}$ channel value of the pixel whose coordinates are (x,y) in the $I_{org}$ is completed; if the $D_{ESB_{i,new}}(x,y)$ is not equal to the $D_{hide}(j)$, a step (3) is executed; (3) setting $V_{i,new}(x,y)=V_i(x,y)-N\times SL_i(x,y)$; (4) after the step (3), according to the $V_{i,new}(x,y)$, determining 5-bit exponent corresponding to the $V_{i,new}(x,y)$ and recording the 5-bit exponent as $E_{i,new}(x,y)$; and then through a manner as same as the step ①_3, according to the $V_{i,new}(x,y)$ and the $E_{i,new}(x,y)$, determining an embedding significance bit of the information to be embedded of the $V_{i,new}(x,y)$ and recording the embedding significance bit as the $ESB_{i,new}(x,y)$; and then judging whether the $D_{ESB_{i,new}}(x,y)$ of the $ESB_{i,new}(x,y)^{th}$ embedding significance bit of the information to be embedded of the $V_{i,new}(x,y)$ is equal to the $D_{hide}(j)$, wherein if the $D_{ESB_{i,new}}(x,y)$ is equal to the $D_{hide}(j)$, $V_i(x,y)=V_{i,new}(x,y)$ is set, so that embedding information into the $i^{th}$ channel value of the pixel whose coordinates are (x,y) in the $I_{org}$ is completed; if the $D_{ESB_{i,new}}(x,y)$ is not equal to the $D_{hide}(j)$, a step (5) is executed; and (5) setting N=N+1, and then returning to the step (1) to go on, wherein: the $V_{i,new}(x,y)$ is an introduced intermediate variable, N is an integer whose initial value is equal to 1, $SL_i(x,y)$ is a step length corresponding to the $E_i(x,y)$, and "=" in the $SL_i(x,y)=2^{E_i(x,y)-15}$, $V_i(x,y)=V_{i,new}(x,y)$ and N=N+1 is an assignment symbol; and ①_5 according to the numerical conversion formula in OpenEXR format, storing every channel value embedded with the information of every pixel in the $I_{org}$, and obtaining a high dynamic range image embedded with the secret information;

the step of extracting the secret information comprises:

②_1 recording the high dynamic range image embedded with the secret information as $I_{stego}$, wherein: a height of the $I_{stego}$ is R and a width thereof is C;

②_2 according to the numerical conversion formula in OpenEXR format, obtaining three channel values embedded with the information of every pixel in the $I_{stego}$, recording an $i^{th}$ channel value embedded with the information of a pixel whose coordinates are (x,y) in the $I_{stego}$ as $V_i'(x,y)$, wherein:

$$V_i'(x, y) = \begin{cases} (-1)^{S_i'(x,y)} 2^{-14}\left(0 + \dfrac{M_i'(x, y)}{1024}\right) & E_i'(x, y) = 0, M_i'(x, y) > 0 \\ (-1)^{S_i'(x,y)} 2^{E_i'(x,y)-15}\left(1 + \dfrac{M_i'(x, y)}{1024}\right) & 1 \leq E_i'(x, y) \leq 30 \end{cases},$$

here, $1 \leq x \leq R$, $1 \leq y \leq C$, i is equal to 1, 2 or 3, a first channel value represents R channel value, a second channel value represents G channel value, a third channel value represents B channel value, $S_i'(x,y)$ represents one sign bit of the $i^{th}$ channel of the pixel whose coordinates are (x,y) in the $I_{stego}$, $E_i'(x,y)$ represents 5-bit exponent of the $i^{th}$ channel of the pixel whose coordinates are (x,y) in the $I_{stego}$, $M_i'(x,y)$ represents 10-bit mantissa of the $i^{th}$ channel of the pixel whose coordinates are (x,y) in the $I_{stego}$;

②_3 according to the secret key Key2, obtaining a position where the information is embedded of every channel value embedded with the information of every pixel in the $I_{stego}$, and recording the position in the $V_i'(x,y)$ as $ESB_i'(x,y)$;

②_4 extracting information from every channel value embedded with the information of every pixel in the $I_{stego}$, wherein: extracting information from the $V_i'(x,y)$ comprises: recording a value of an $ESB_i'(x,y)^{th}$ embedded position in the $V_i'(x,y)$ as $D_{ESB_i'}(x,y)$, and then taking the $D_{ESB_i'}(x,y)$ as the information extracted from the $V_i'(x,y)$ and recording as $D_{ex}(u)$, wherein: $D_{ESB_i'}(x,y) \in [0,9]$, an initial value of the u is 1, a step length thereof is 1, $D_{ex}(u) \in [0,9]$; and ②_5 forming sequences through the information extracted from all channel values embedded with information of all pixels in the $I_{stego}$, recording the sequences as $W_{ex}$, decrypting the $W_{ex}$ according to the secret key Key1, obtaining decrypted secret information sequences, and recording the obtained decrypted secret information sequences as W*.

In the step ①_1, the encryption algorithm is Arnold transform or chaotic transformation, the W is scrambled through Arnold transform or chaotic transformation.

In the step 1_3, if $V_i(x,y) \in [2^{E_i(x,y)-15}, 2^{E_i(x,y)-14})$ and $E_i(x,y) \in [0,19]$, then $ESB_i(x,y)=5$; if $V_i(x,y) \in [2^5, 2^6)$ and $E_i(x,y)= 20$, then $ESB_i(x,y)=4$; if $V_i(x,y) \in [2^6, 10^2)$ and $E_i(x,y)= 21$, then $ESB_i(x,y)=3$; if $V_i(x,y) \in [10^2, 2^7)$ and $E_i(x,y)=21$, then $ESB_i(x,y)=4$; if $V_i(x,y) \in [2^7, 2^8)$ and $E_i(x,y)=22$, then $ESB_i(x,y)=3$; if $V_i(x,y) \in [2^8, 2^9)$ and $E_i(x,y)=23$, then $ESB_i(x,y)=3$; if $V_i(x,y) \in [2^9, 10^3)$ and $E_i(x,y)=24$, then $ESB_i(x,y)=3$; if $V_i(x,y) \in [10^3, 2^{10})$ and $E_i(x,y)=24$, then $ESB_i(x,y)=4$; if $V_i(x,y) \in [2^{10}, 2^{11})$ and $E_i(x,y)=25$, then $ESB_i(x,y)=4$; if $V_i(x,y) \in [2^{11}, 2^{12})$ and $E_i(x,y)=26$, then $ESB_i(x,y)=3$; if $V_i(x,y) \in [2^{12}, 2^{13})$ and $E_i(x,y)=27$, then $ESB_i(x,y)=3$; if $V_i(x,y) \in [2^{13}, 10^4)$ and $E_i(x,y)=28$, then $ESB_i(x,y)=3$; if $V_i(x,y) \in [10^4, 2^{14})$ and $E_i(x,y)=28$, then $ESB_i(x,y)=4$; if $V_i(x,y) \in [2^{14}, 2^{15})$ and $E_i(x,y)=29$, then $ESB_i(x,y)=4$; if $V_i(x,y) \in [2^{15}, 65504]$ and $E_i(x,y)=30$, then $ESB_i(x,y)=4$.

Compared with the prior art, the present invention has advantages as follows.

(1) The embedding rate and the image fidelity of the present invention are high. In the high dynamic range image in OpenEXR format, when the embedding rate of the secret information is 30 bpps, the high dynamic range image after being embedded with the secret information is high in the image fidelity and small in the image quality volatility, thereby better meeting the human visual characteristics.

(2) The method provided by the present invention adopts the secret information and the carrier image embedding position to make the double-layer encryption, so as to effectively enhance the security, and the encryption process is low in complexity and has good practicability.

(3) The method provided by the present invention utilizes the conversion relationship between the data in OpenEXR Format and corresponding floating point data to modify the suitable floating point effective bits for embedding the secret information, which has low complexity, fast operation speed, excellent performance and universal practicability.

DETAILED DESCRIPTION OF THE PREFERRED EMBODIMENT

The present invention is further described in detail accompanying with the drawings as follows.

The present invention provides a high dynamic range image information hiding method, which comprises steps of embedding secret information and extracting the secret information.

Figure 1:
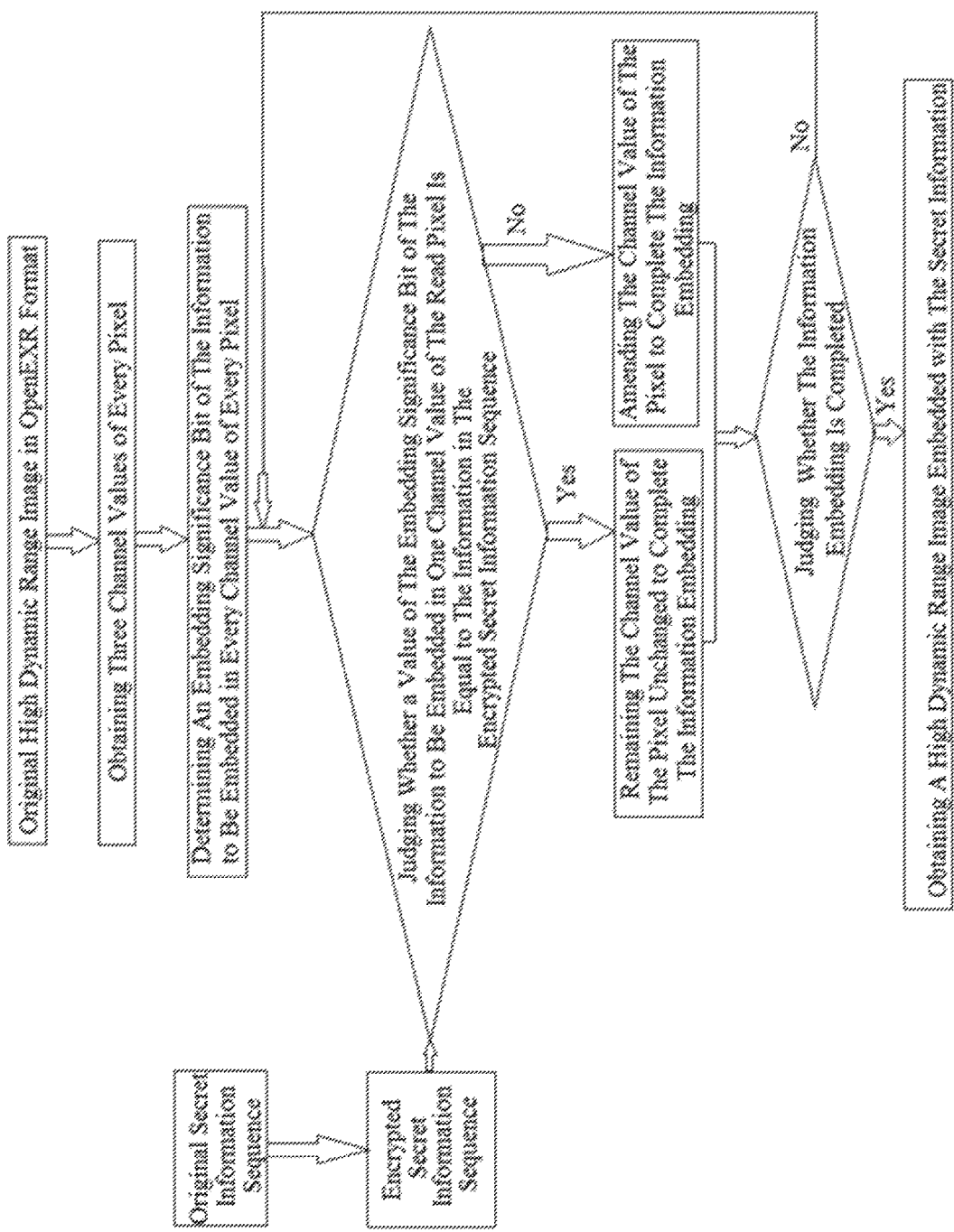
FIG. 1 is a flow chart of embedding secret information of a method provided by the present invention.

FIG. 1 shows the flow chart of the step of embedding secret information which specifically comprises:

①_1 recording an original high dynamic range image in OpenEXR format to be embedded with the secret information as $I_{org}$, wherein: a height of the $I_{org}$ is R and a width thereof is C, recording an original secret information sequence for being embedded into the original high dynamic range image as W, wherein: a value of every information of the W is an integer from 0 to 9, encrypting the W through encryption algorithm, obtaining an encrypted secret information sequence, recording the encrypted secret information sequence as $W_{hide}$, and taking the encryption algorithm as a secret key Key1, wherein: a length of the W is equal to R×C×3;

wherein in the step ①_1 of this embodiment, the encryption algorithm is Arnold transform or chaotic transformation, the W is scrambled through Arnold transform or chaotic transformation;

①_2 according to a numerical conversion formula in OpenEXR format, obtaining three channel values of every pixel in the $I_{org}$, recording an $i^{th}$ channel value of a pixel whose coordinates are (x,y) in the $I_{org}$ as $V_i(x,y)$, wherein $$V_i(x,y) = \begin{cases} (-1)^{S_i(x,y)} 2^{-14}\left(0 + \dfrac{M_i(x,y)}{1024}\right) & E_i(x,y)=0, M_i(x,y)>0 \\ (-1)^{S_i(x,y)} 2^{E_i(x,y)-15}\left(1 + \dfrac{M_i(x,y)}{1024}\right) & 1 \le E_i(x,y) \le 30 \end{cases},$$

here, 1≤x≤R, 1≤y≤C, i is equal to 1, 2 or 3, a first channel value represents R channel value, a second channel value represents G channel value, a third channel value represents B channel value, $S_i(x,y)$ represents one sign bit of the $i^{th}$ channel of the pixel whose coordinates are (x,y) in the $I_{org}$, $E_i(x,y)$ represents 5-bit exponent of the $i^{th}$ channel of the pixel whose coordinates are (x,y) in the $I_{org}$, $M_i(x,y)$ represents 10-bit mantissa of the $i^{th}$ channel of the pixel whose coordinates are (x,y) in the $I_{org}$;

①_3 according to every channel value and corresponding 5-bit exponent of every pixel in the $I_{org}$, determining an embedding significance bit of the information to be embedded in every channel value of every pixel in the $I_{org}$, recording the embedding significance bit (ESB) of the information to be embedded in the $i^{th}$ channel value of the pixel whose coordinates are (x,y) in the $I_{org}$ as $ESB_i(x,y)$, and recording the embedding significance bit of the information to be embedded in every channel value of every pixel in the $I_{org}$ as a secret key Key2;

wherein in the step ①_3 of this embodiment, if $V_i(x,y) \in [2^{E_i(x,y)-15}, 2^{E_i(x,y)-14})$ and $E_i(x,y) \in [0,19]$, then $ESB_i(x,y)=5$; if $V_i(x,y) \in [2^5, 2^6)$ and $E_i(x,y)=20$, then $ESB_i(x,y)=4$; if $V_i(x,y) \in [2^6, 10^2)$ and $E_i(x,y)=21$, then $ESB_i(x,y)=3$; if $V_i(x,y) \in [10^2, 2^7)$ and $E_i(x,y)=21$, then $ESB_i(x,y)=4$; if $V_i(x,y) \in [2^7, 2^8)$ and $E_i(x,y)=22$, then $ESB_i(x,y)=3$; if $V_i(x,y) \in [2^8, 2^9)$ and $E_i(x,y)=23$, then $ESB_i(x,y)=3$; if $V_i(x,y) \in [2^9, 10^3)$ and $E_i(x,y)=24$, then $ESB_i(x,y)=3$; if $V_i(x,y) \in [10^3, 2^{10})$ and $E_i(x,y)=24$, then $ESB_i(x,y)=4$; if $V_i(x,y) \in [2^{10}, 2^{11})$ and $E_i(x,y)=25$, then $ESB_i(x,y)=4$; if $V_i(x,y) \in [2^{11}, 2^{12})$ and $E_i(x,y)=26$, then $ESB_i(x,y)=3$; if $V_i(x,y) \in [2^{12}, 2^{13})$ and $E_i(x,y)=27$, then $ESB_i(x,y)=3$; if $V_i(x,y) \in [2^{13}, 10^4)$ and $E_i(x,y)=28$, then $ESB_i(x,y)=3$; if $V_i(x,y) \in [10^4, 2^{14})$ and $E_i(x,y)=28$, then $ESB_i(x,y)=4$; if $V_i(x,y) \in [2^{14}, 2^{15})$ and $E_i(x,y)=29$, then $ESB_i(x,y)=4$; if $V_i(x,y)[2^{15}, 65504]$ and $E_i(x,y)=30$, then $ESB_i(x,y)=4$;

①_4 embedding information into every channel value of every pixel in the $I_{org}$, wherein: embedding information into the $i^{th}$ channel value $V_i(x,y)$ of the pixel whose coordinates are (x,y) in the $I_{org}$ comprises:

①_4a recording a value of an $ESB_i(x,y)^{th}$ embedding significance bit of the information to be embedded of the $V_i(x,y)$ as $D_{ESB_i}(x,y)$, setting a $j^{th}$ information in the $W_{hide}$ as a current information to be embedded in the $W_{hide}$, recording the $j^{th}$ information as $D_{hide}(j)$, wherein: $D_{ESB_i}(x,y) \in [0,9]$, an initial value of the j is 1, 1≤j≤J, the J represents a length of the W, $D_{hide}(j) \in [0,9]$;

①_4b judging whether the $D_{ESB_i}(x,y)$ is equal to the $D_{hide}(j)$, wherein: if the $D_{ESB_i}(x,y)$ is equal to the $D_{hide}(j)$, the $V_i(x,y)$ is kept unchanged, so that embedding information into the $i^{th}$ channel value of the pixel whose coordinates are (x,y) in the $I_{org}$ is completed; if the $D_{ESB_i}(x,y)$ is not equal to the $D_{hide}(j)$, the $V_i(x,y)$ is amended to complete embedding information into the $i^{th}$ channel value of the pixel whose coordinates are (x,y) in the $I_{org}$, wherein: the amendment comprises:

(1) setting $V_{i,new}(x,y)=V_i(x,y)+N \times SL_i(x,y)$, (2) after the step (1), according to the $V_{i,new}(x,y)$, determining 5-bit exponent corresponding to the $V_{i,new}(x,y)$ and recording the 5-bit exponent as $E_{i,new}(x,y)$, and then through a manner as same as the step ①_3, according to the $V_{i,new}(x,y)$ and the $E_{i,new}(x,y)$, determining an embedding significance bit of the information to be embedded of the $V_{i,new}(x,y)$ and recording the embedding significance bit as $ESB_{i,new}(x,y)$; and then judging whether the $D_{ESB_{i,new}}(x,y)$ of the $ESB_{i,new}(x,y)^{th}$ embedding significance bit of the information to be embedded of the $V_{i,new}(x,y)$ is equal to the $D_{hide}(j)$, wherein if the $D_{ESB_{i,new}}(x,y)$ is equal to the $D_{hide}(j)$, $V_i(x,y)=V_{i,new}(x,y)$ is set, so that embedding information into the $i^{th}$ channel value of the pixel whose coordinates are (x,y) in the $I_{org}$ is completed; if the $D_{ESB_{i,new}}(x,y)$ is not equal to the $D_{hide}(j)$, a step (3) is executed; (3) setting $V_{i,new}(x,y)=V_i(x,y)-N \times SL_i(x,y)$; (4) after the step (3), according to the $V_{i,new}(x,y)$, determining 5-bit exponent corresponding to the $V_{i,new}(x,y)$ and recording the 5-bit exponent as $E_{i,new}(x,y)$; and then through a manner as same as the step ①_3, according to the $V_{i,new}(x,y)$ and the $E_{i,new}(x,y)$, determining an embedding significance bit of the information to be embedded of the $V_{i,new}(x,y)$ and recording the embedding significance bit as the $ESB_{i,new}(x,y)$; and then judging whether the $D_{ESB_{i,new}}(x,y)$ of the $ESB_{i,new}(x,y)^{th}$ embedding significance bit of the information to be embedded of the $V_{i,new}(x,y)$ is equal to the $D_{hide}(j)$, wherein if the $D_{ESB_{i,new}}(x,y)$ is equal to the $D_{hide}(j)$, $V_i(x,y)=V_{i,new}(x,y)$ is set, so that embedding information into the $i^{th}$ channel value of the pixel whose coordinates are (x,y) in the $I_{org}$ is completed; if the $D_{ESB_{i,new}}(x,y)$ is not equal to the $D_{hide}(j)$, a step (5) is executed; and (5) setting N=N+1, and then returning to the step (1) to go on, wherein: the $V_{i,new}(x,y)$ is an introduced intermediate variable, N is an integer whose initial value is equal to 1, $SL_i(x,y)$ is a step length corresponding to the $E_i(x,y)$, and "=" in the $SL_i(x,y)=2^{E_i(x,y)-15}$, $V_i(x,y)=V_{i,new}(x,y)$ and N=N+1 is an assignment symbol; and ①_5 according to the numerical conversion formula in OpenEXR format, storing every channel value embedded with the information of every pixel in the $I_{org}$, and obtaining a high dynamic range image embedded with the secret information.

Figure 2:
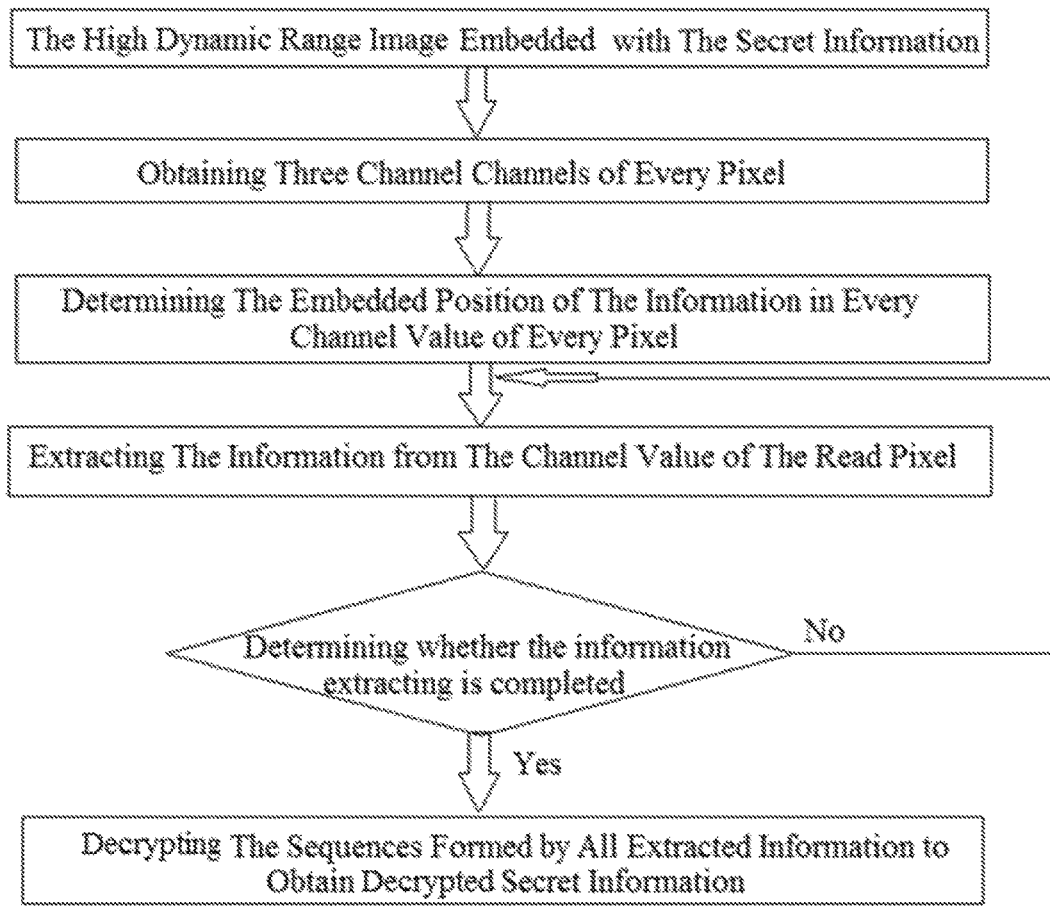
FIG. 2 is a flow chart of extracting secret information of the method provided by the present invention.

FIG. 2 shows a flow chart of the step of extracting the secret information which comprises:

②_1 recording the high dynamic range image embedded with the secret information as $I_{stego}$, wherein: a height of the $I_{stego}$ is R and a width thereof is C;

②_2 according to the numerical conversion formula in OpenEXR format, obtaining three channel values embedded with the information of every pixel in the $I_{stego}$, recording an $i^{th}$ channel value embedded with the information of a pixel whose coordinates are (x,y) in the $I_{stego}$ as $V_i'(x,y)$, wherein:

$$V_i'(x, y) = \begin{cases} (-1)^{S_i'(x,y)} 2^{-14}\left(0 + \dfrac{M_i'(x, y)}{1024}\right) & E_i'(x, y) = 0, M_i'(x, y) > 0 \\ (-1)^{S_i'(x,y)} 2^{E_i'(x,y)-15}\left(1 + \dfrac{M_i'(x, y)}{1024}\right) & 1 \le E_i'(x, y) \le 30 \end{cases},$$

here, $1 \le x \le R$, $1 \le y \le C$, i is equal to 1, 2 or 3, a first channel value represents R channel value, a second channel value represents G channel value, a third channel value represents B channel value, $S_i'(x,y)$ represents one sign bit of the $i^{th}$ channel of the pixel whose coordinates are (x,y) in the $I_{stego}$, $E_i'(x,y)$ represents 5-bit exponent of the $i^{th}$ channel of the pixel whose coordinates are (x,y) in the $I_{stego}$, $M_i'(x,y)$ represents 10-bit mantissa of the $i^{th}$ channel of the pixel whose coordinates are (x,y) in the $I_{stego}$;

②_3 according to the secret key Key2, obtaining a position where the information is embedded of every channel value embedded with the information of every pixel in the $I_{stego}$, and recording the position in the $V_i'(x,y)$ as $ESB_i'(x,y)$;

②_4 extracting information from every channel value embedded with the information of every pixel in the $I_{stego}$, wherein: extracting information from the $V_i'(x,y)$ comprises: recording a value of an $ESB_i'(x,y)^{th}$ embedded position in the $S_i'(x,y)$ as $D_{ESB_i}(x,y)$, and then taking the $D_{ESB_i}(x,y)$ as the information extracted from the $V_i'(x,y)$ and recording as $D_{ex}(u)$, wherein: $D_{ESB_i}(x,y) \in [0,9]$, an initial value of the u is 1, a step length thereof is 1, $D_{ex}(u) \in [0,9]$; and ②_5 forming sequences through the information extracted from all channel values embedded with information of all pixels in the $I_{stego}$, recording the sequences as $W_{ex}$, decrypting the $W_{ex}$ according to the secret key Key1, obtaining decrypted secret information sequences, and recording the obtained decrypted secret information sequences as W*.

In order to further illustrate the feasibility and effectiveness, the method provided by the present invention is tested.

In this example, a public high dynamic range image library Max Planck Institut informatik is selected, whose URL (Universal Resource Location) is resources.mpi-inf.mpg.de/hdr/gallery.html. There are seven high dynamic range images, whose specific information is shown in Table 1 as follows.

TABLE 1

Test Data Information of the High Dynamic Range Images

| No. | Name of High Dynamic Range Images | Size of High Dynamic Range Images | Dynamic Range | Description |
|---|---|---|---|---|
| 1 | AtriumMorning | 760 × 1016 | 4.5 | Natural, Indoor |
| 2 | AtriumNight | 760 × 1016 | 8.6 | Natural, Indoor |
| 3 | Iwate | 3270 × 1396 | 5.8 | Natural, Indoor |
| 4 | mpi_atrium_1 | 1024 × 676 | 4.4 | Natural, Indoor |
| 5 | nancy_cathedral_1 | 1536 × 2048 | 4.4 | Natural, Indoor |
| 6 | nancy_cathedral_2 | 1536 × 2048 | 4.5 | Natural, Indoor |
| 7 | snow | 2048 × 1536 | 3 | Natural, Indoor |

The secret information is embedded into the above seven high dynamic range images according to the step of embedding secret information of the method provided by the present invention, and then the secret information is extracted according to the step of extracting secret information of the method provided by the present invention; and then, through an existing HDR-VDP-2 method (reference: M. Narwaria, R. K. Mantiuk, M. P. D. Silva, P. L. Callet. "HDR-VDP-2.2: A Calibrated Method for Objective Quality Prediction of High Dynamic Range and Standard Images". In *Journal of Electronic Imaging*, 24(1), 2015), the image quality values of the high dynamic range images embedded with the secret information relative to the original high dynamic range images are evaluated; and through a PSNR method, the image quality values of the low dynamic range images which are processed through tone mapping the high dynamic range images embedded with the secret information, relative to the low dynamic range images which are processed through tone mapping the original dynamic range images, are evaluated, that is, the image fidelity is evaluated after the secret information is hidden; the image quality values obtained through the HDR-VDP-2 method are recorded as $Q_{vdp}$, here, $Q_{vdp} \in [0,100]$, the higher the value of the $Q_{vdp}$, the higher the image fidelity; the image quality values obtained through the PSNR method are recorded as PSNR.

Figure 3:
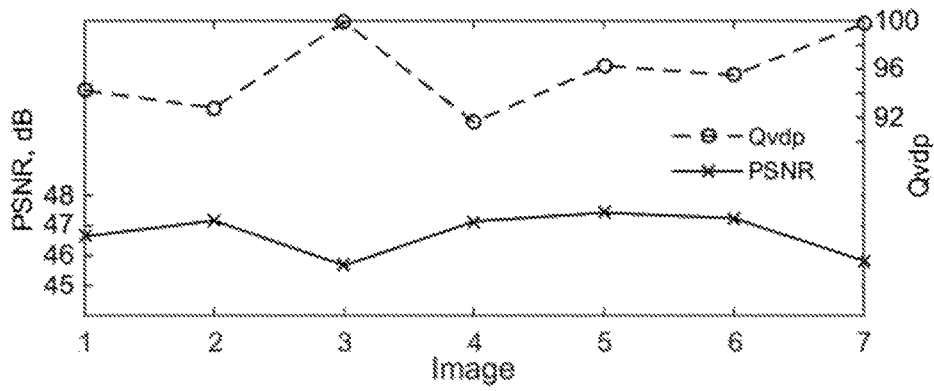
FIG. 3 shows image quality values of seven high dynamic range images embedded with the secret information relative to original high dynamic range images, and image quality values of the low dynamic range images which are processed through tone mapping the high dynamic range images embedded with the secret information, relative to the low dynamic range images which are processed through tone mapping the original dynamic range images.

FIG. 3 shows values of the $Q_{vdp}$ and the PSNR corresponding to the seven high dynamic range images. It can be seen from FIG. 3 that when the embedded rate of the secret information is 30 bpps, $Q_{vdp} > 91.61$, PSNR>45.67, the image fidelity is higher. In FIG. 3, Image represents the high dynamic range images.

The embedding significance bits embedded with information corresponding to the same 5 index bits of the channels of the pixels of the high dynamic range images are optional. Therefore, in practical application, the embedding significance bits and related data of the embedded information used in the method provided by the invention are listed in Table 2. $MPWR_i(x,y)$ of MPWR (Max Pixel-level Weber Ratio) of the $i^{th}$ channel value of the pixel whose coordinates are (x,y) in the $I_{org}$ of Table 2 are able to be obtained through $$MPWR_i(x, y) = T \times SL_i(x, y) / PV_{i,min}$$

$$= T \times 2^{E_i(x,y)-25} / 2^{E_i(x,y)-15}$$

$$= 2^{-10} \times T,$$

wherein: T represents maximum number of iterations, T is obtained through the $E_i(x,y)$ and the $ESB_i(x,y)$, $PV_{i,min}$ represents a minimum value of the value range of the $V_i(x,y)$ and is obtained through the $E_i(x,y)$. It can be known from Table 2 that the $MPWR_i(x,y)$ varies with different value ranges of the $V_i(x,y)$ and is less than 0.04, which means that the method provided by the present invention has high image fidelity and small image quality volatility.

TABLE 2

Embedding Significance Bits of the Embedded Information and Related Data of the MPWR

| $E_i$ (x, y) | Value Ranges of $V_i$ (x, y) | $ESB_i$ (x, y) | $MPWR_i$ (x, y) |
|---|---|---|---|
| [0, 19] | $V_i(x, y) \in [2^{E_i(x, y)-15}, 2^{E_i(x, y)-14})$ | 5 | <0.0186 |
| 20 | $V_i(x, y) \in [2^5, 2^6)$ | 4 | 0.0078 |
| 21 | $V_i(x, y) \in [2^6, 10^2)$ | 3 | 0.0068 |
| 21 | $V_i(x, y) \in [10^2, 2^7)$ | 4 | 0.0043 |
| 22 | $V_i(x, y) \in [2^7, 2^8)$ | 3 | 0.0352 |
| 23 | $V_i(x, y) \in [2^8, 2^9)$ | 3 | 0.0176 |
| 24 | $V_i(x, y) \in [2^9, 10^3)$ | 3 | 0.0088 |
| 24 | $V_i(x, y) \in [10^3, 2^{10})$ | 4 | 0.0045 |
| 25 | $V_i(x, y) \in [2^{10}, 2^{11})$ | 4 | 0.0049 |
| 26 | $V_i(x, y) \in [2^{11}, 2^{12})$ | 3 | 0.0225 |
| 27 | $V_i(x, y) \in [2^{12}, 2^{13})$ | 3 | 0.0098 |
| 28 | $V_i(x, y) \in [2^{13}, 10^4)$ | 3 | 0.0059 |
| 28 | $V_i(x, y) \in [10^4, 2^{14})$ | 4 | 0.0048 |
| 29 | $V_i(x, y) \in [2^{14}, 2^{15})$ | 4 | 0.0088 |
| 30 | $V_i(x, y) \in [2^{15}, 65504]$ | 4 | 0.0088 |

Y. Cheng, C. Wang, "A novel approach to steganography in high dynamic range images", IEEE Multimedia, 16(3), pp. 70-80, 2009; M. Li, N. Huang, C. Wang, "A data hiding scheme for HDR images", Int. J. Innovative Comput. Inf. Control, 7(5), pp. 2021-2035, 2011; and Y. Lin, C. Wang, W. Chen, F. Lin, W. Lin, "A novel data hiding algorithm for high dynamic range images", IEEE Trans. Multimedia, 19(1), pp. 196-211, 2017 are top algorithms of the existing high dynamic range image information hiding. In this case, the three top algorithms and the method provided by the present invention are compared in the embedding rate and the image fidelity, and the comparison data are listed in Table 3. It can be seen from Table 3 that the embedding rate, the image fidelity and the image quality volatility of the high dynamic range image embedded with the secret information of the method provided by the present invention are better than the three top algorithms. The method provided by the present invention shows excellent performance and universal practicality.

TABLE 3

Method Provided By the Invention Is Compared With the Three Top Information Hiding Algorithm In the Comprehensive Performance

| | First Method | Second Method | Third Method | Method Provided By the Present Invention |
|---|---|---|---|---|
| Format of High Dynamic Range Image | RGBE | LogLuv | OpenEXR | OpenEXR |
| Embedding Rate (bpp) | 5.04-9.70 | 26 | 2.43-20.00 | 30 |
| $Q_{vdp}$ | 32.27-54.74 | 32.80-33.61 | 63.01-100 | 91.61-100 |
| PSNR (dB) | 32.44-32.90 | 30.47-37.00 | 45.12-82.32 | 45.67-47.42 |

This embodiment only shows that the high dynamic range image is fully embedded, that is, every channel of every pixel in the high dynamic range image is embedded with one information, an amount of all embedded information is R×C×3. In the actual process, it may be not fully embedded, such as the information is only embedded into every pixel of one or two channels in the high dynamic range image, so that an amount of all embedded information is less than R×C×3.

What is claimed is:

1. A high dynamic range image information hiding method, comprising steps of embedding secret information and extracting the secret information, wherein:

the step of embedding secret information comprises:

① _1 recording an original high dynamic range image in OpenEXR format to be embedded with the secret information as $I_{org}$, wherein: a height of the $I_{org}$ is R and a width thereof is C, recording an original secret information sequence for being embedded into the original high dynamic range image as W, wherein: a value of every information of the W is an integer from 0 to 9, encrypting the W through encryption algorithm, obtaining an encrypted secret information sequence, recording the encrypted secret information sequence as $W_{hide}$, and taking the encryption algorithm as a secret key Key1, wherein: a length of the W is equal to R×C×3;

① _2 according to a numerical conversion formula in OpenEXR format, obtaining three channel values of every pixel in the $I_{org}$, recording an $i^{th}$ channel value of a pixel whose coordinates are (x,y) in the $I_{org}$ as $V_i(x,y)$, wherein $$V_i(x, y) = \begin{cases} (-1)^{S_i(x,y)} 2^{-14}\left(0 + \dfrac{M_i(x, y)}{1024}\right) & E_i(x, y) = 0, M_i(x, y) > 0 \\ (-1)^{S_i(x,y)} 2^{E_i(x,y)-15}\left(1 + \dfrac{M_i(x, y)}{1024}\right) & 1 \leq E_i(x, y) \leq 30 \end{cases},$$

here, $1 \leq x \leq R$, $1 \leq y \leq C$, i is equal to 1, 2 or 3, a first channel value represents R channel value, a second channel value represents G channel value, a third channel value represents B channel value, $S_i(x,y)$ represents one sign bit of the $i^{th}$ channel of the pixel whose coordinates are (x,y) in the $I_{org}$, $E_i(x,y)$ represents 5-bit exponent of the $i^{th}$ channel of the pixel whose coordinates are (x,y) in the $I_{org}$, $M_i(x,y)$ represents 10-bit mantissa of the $i^{th}$ channel of the pixel whose coordinates are (x,y) in the $I_{org}$;

① _3 according to every channel value and corresponding 5-bit exponent of every pixel in the $I_{org}$, determining an embedding significance bit of the information to be embedded in every channel value of every pixel in the $I_{org}$, recording the embedding significance bit of the information to be embedded in the $i^{th}$ channel value of the pixel whose coordinates are (x,y) in the $I_{org}$ as $ESB_i(x,y)$, and recording the embedding significance bit of the information to be embedded in every channel value of every pixel in the $I_{org}$ as a secret key Key2;

① _4 embedding information into every channel value of every pixel in the $I_{org}$, wherein: embedding information into the $i^{th}$ channel value $V_i(x,y)$ of the pixel whose coordinates are (x,y) in the $I_{org}$ comprises:

① _4a recording a value of an $ESB_i(x,y)^{th}$ embedding significance bit of the information to be embedded of the $V_i(x,y)$ as $D_{ESB_i}(x,y)$, setting a $j^{th}$ information in the $W_{hide}$ as a current information to be embedded in the $W_{hide}$, recording the $j^{th}$ information as $D_{hide}(j)$, wherein: $D_{ESB_i}(x,y) \in [0,9]$, an initial value of the j is 1, $1 \leq j \leq J$, the J represents a length of the W, $D_{hide}(j) \in [0,9]$;

① _4b judging whether the $D_{ESB_i}(x,y)$ is equal to the $D_{hide}(j)$, wherein: if the $D_{ESB_i}(x,y)$ is equal to the $D_{hide}(j)$, the $V_i(x,y)$ is kept unchanged, so that embedding information into the $i^{th}$ channel value of the pixel whose coordinates are (x,y) in the $I_{org}$ is completed; if the $D_{ESB_i}$(x,y) is not equal to the $D_{hide}$(j), the $V_i$(x,y) is amended to complete embedding information into the $i^{th}$ channel value of the pixel whose coordinates are (x,y) in the $I_{org}$, wherein: the amendment comprises: (1) setting $V_{i,new}$(x,y)=$V_i$(x,y)+N×$SL_i$(x,y), (2) after the step (1), according to the $V_{i,new}$(x,y), determining 5-bit exponent corresponding to the $V_{i,new}$(x,y) and recording the 5-bit exponent as $E_{i,new}$(x,y), and then through a manner as same as the step ①_3, according to the $V_{i,new}$(x,y) and the $E_{i,new}$(x,y), determining an embedding significance bit of the information to be embedded of the $V_{i,new}$(x,y) and recording the embedding significance bit as $ESB_{i,new}$(x,y); and then judging whether the $D_{ESB_{i,new}}$(x,y) of the $ESB_{i,new}$(x,y)$^{th}$ embedding significance bit of the information to be embedded of the $V_{i,new}$(x,y) is equal to the $D_{hide}$(j), wherein if the $D_{ESB_{i,new}}$(x,y) is equal to the $D_{hide}$(j), $V_i$(x,y)=$V_{i,new}$(x,y) is set, so that embedding information into the $i^{th}$ channel value of the pixel whose coordinates are (x,y) in the $I_{org}$ is completed; if the $D_{ESB_{i,new}}$(x,y) is not equal to the $D_{hide}$(j), a step (3) is executed; (3) setting $V_{i,new}$(x,y)=$V_i$(x,y)−N×$SL_i$(x,y); (4) after the step (3), according to the $V_{i,new}$(x,y), determining 5-bit exponent corresponding to the $V_{i,new}$(x,y) and recording the 5-bit exponent as $E_{i,new}$(x,y); and then through a manner as same as the step ①_3, according to the $V_{i,new}$(x,y) and the $E_{i,new}$(x,y), determining an embedding significance bit of the information to be embedded of the $V_{i,new}$(x,y) and recording the embedding significance bit as the $ESB_{i,new}$(x,y); and then judging whether the $D_{ESB_{i,new}}$(x,y) of the $ESB_{i,new}$(x,y)$^{th}$ embedding significance bit of the information to be embedded of the $V_{i,new}$(x,y) is equal to the $D_{hide}$(j), wherein if the $D_{ESB_{i,new}}$(x,y) is equal to the $D_{hide}$(j), $V_i$(x,y)=$V_{i,new}$(x,y) is set, so that embedding information into the $i^{th}$ channel value of the pixel whose coordinates are (x,y) in the $I_{org}$ is completed; if the $D_{ESB_{i,new}}$(x,y) is not equal to the $D_{hide}$(j), a step (5) is executed; and (5) setting N=N+1, and then returning to the step (1) to go on, wherein: the $V_{i,new}$(x,y) is an introduced intermediate variable, N is an integer whose initial value is equal to 1, $SL_i$(x,y) is a step length corresponding to the $E_i$(x,y), and "=" in the $SL_i$(x,y)=$2^{E_i(x,y)-15}$, $V_i$(x,y)=$V_{i,new}$(x,y) and N=N+1 is an assignment symbol; and ①_5 according to the numerical conversion formula in OpenEXR format, storing every channel value embedded with the information of every pixel in the $I_{org}$, and obtaining a high dynamic range image embedded with the secret information;

the step of extracting the secret information comprises:

②_1 recording the high dynamic range image embedded with the secret information as $I_{stego}$, wherein: a height of the $I_{stego}$ is R and a width thereof is C;

②_2 according to the numerical conversion formula in OpenEXR format, obtaining three channel values embedded with the information of every pixel in the $I_{stego}$, recording an $i^{th}$ channel value embedded with the information of a pixel whose coordinates are (x,y) in the $I_{stego}$ as $V_i'$(x,y), wherein:

$$V_i'(x,y) = \begin{cases} (-1)^{S_i'(x,y)} 2^{-14}\left(0 + \dfrac{M_i'(x,y)}{1024}\right) & E_i'(x,y)=0, M_i'(x,y)>0 \\ (-1)^{S_i'(x,y)} 2^{E_i'(x,y)-15}\left(1 + \dfrac{M_i'(x,y)}{1024}\right) & 1 \le E_i'(x,y) \le 30 \end{cases},$$

here, 1≤x≤R, 1≤y≤C, i is equal to 1, 2 or 3, a first channel value represents R channel value, a second channel value represents G channel value, a third channel value represents B channel value, $S_i'$(x,y) represents one sign bit of the $i^{th}$ channel of the pixel whose coordinates are (x,y) in the $I_{stego}$, $E_i'$(x,y) represents 5-bit exponent of the $i^{th}$ channel of the pixel whose coordinates are (x,y) in the $I_{stego}$, $M_i'$(x,y) represents 10-bit mantissa of the $i^{th}$ channel of the pixel whose coordinates are (x,y) in the $I_{stego}$;

②_3 according to the secret key Key2, obtaining a position where the information is embedded of every channel value embedded with the information of every pixel in the $I_{stego}$, and recording the position in the $V_i'$(x,y) as $ESB_i'$(x,y);

②_4 extracting information from every channel value embedded with the information of every pixel in the $I_{stego}$, wherein: extracting information from the $V_i'$(x,y) comprises: recording a value of an $ESB_i'$(x,y)$^{th}$ embedded position in the $V_i'$(x,y) as $D_{ESB_i}$(x,y), and then taking the $D_{ESB_i}$(x,y) as the information extracted from the $V_i'$(x,y) and recording as $D_{ex}$(u), wherein: $D_{ESB_i}$(x,y)∈[0,9], an initial value of the u is 1, a step length thereof is 1, $D_{ex}$(u)∈[0,9]; and ②_5 forming sequences through the information extracted from all channel values embedded with information of all pixels in the $I_{stego}$, recording the sequences as $W_{ex}$, decrypting the $W_{ex}$ according to the secret key Key1, obtaining decrypted secret information sequences, and recording the obtained decrypted secret information sequences as W*.

2. The high dynamic range image information hiding method, as recited in claim 1, wherein: in the step ①_1, the encryption algorithm is Arnold transform or chaotic transformation, and the W is scrambled through the Arnold transform or chaotic transformation.

3. The high dynamic range image information hiding method, as recited in claim 1, wherein: in the step ①_3, if $V_i$(x,y)∈[$2^{E_i(x,y)-15}$, $2^{E_i(x,y)-14}$) and $E_i$(x,y)∈[0,19], then $ESB_i$(x,y)=5; if $V_i$(x,y)∈[$2^5$, $2^6$) and $E_i$(x,y)=20, then $ESB_i$(x,y)=4; if $V_i$(x,y)∈[$2^6$, $10^2$) and $E_i$(x,y)=21, then $ESB_i$(x,y)=3; if $V_i$(x,y)∈[$10^2$, $2^7$) and $E_i$(x,y)=21, then $ESB_i$(x,y)=4; if $V_i$(x,y)∈[$2^7$, $2^8$) and $E_i$(x,y)=22, then $ESB_i$(x,y)=3; if $V_i$(x,y)∈[$2^8$, $2^9$) and $E_i$(x,y)=23, then $ESB_i$(x,y)=3; if $V_i$(x,y)∈[$2^9$, $10^3$) and $E_i$(x,y)=24, then $ESB_i$(x,y)=3; if $V_i$(x,y)∈[$10^3$, $2^{10}$) and $E_i$(x,y)=24, then $ESB_i$(x,y)=4; if $V_i$(x,y)∈[$2^{10}$, $2^{11}$) and $E_i$(x,y)=25, then $ESB_i$(x,y)=4; if $V_i$(x,y)∈[$2^{11}$, $2^{12}$) and $E_i$(x,y)=26, then $ESB_i$(x,y)=3; if $V_i$(x,y)∈[$2^{12}$, $2^{13}$) and $E_i$(x,y)=27, then $ESB_i$(x,y)=3; if $V_i$(x,y)∈[$2^{13}$, $10^4$) and $E_i$(x,y)=28, then $ESB_i$(x,y)=3; if $V_i$(x,y)∈[$10^4$, $2^{14}$) and $E_i$(x,y)=28, then $ESB_i$(x,y)=4; if $V_i$(x,y)∈[$2^{14}$, $2^{15}$) and $E_i$(x,y)=29, then $ESB_i$(x,y)=4; if $V_i$(x,y)∈[$2^{15}$, 65504] and $E_i$(x,y)=30, then $ESB_i$(x,y)=4.

* * * * *